United States Patent Office 3,422,045
Patented Jan. 14, 1969

3,422,045
PROCESS FOR IMPROVED FLEX-RESISTANCE OF SULFUR-MODIFIED POLYCHLOROPRENE
Charles Elmer Aho, Louisville, Ky., assignor to E. I. du Pont de Nemours and Company, Wilmington, Del., a corporation of Delaware
No Drawing. Filed July 27, 1966, Ser. No. 568,151
U.S. Cl. 260—27          8 Claims
Int. Cl. C08f 3/32

ABSTRACT OF THE DISCLOSURE

A method for improving the flex-resistance of sulfur-modified polychloroprene by incorporating minor amounts of levopimaric acid in said polychloroprene.

---

This invention relates to a method for substantially improving the flex resistance of vulcanized polymers of chloroprene. More particularly, it relates to increasing the resistance to cracking under flexure of a sulfur-modified polychloroprene.

The synthetic rubbers comprising polymers and copolymers of chloroprene, commonly known as neoprenes, have been prepared by emulsion polymerization and are widely used where good resistance to chemical and thermal degradation is necessary. Emulsion polymerization techniques have been commercially utilized whereby various types of rosin such as Nancy Wood rosin, are employed in the emulsions. These rosins introduce a variety of constituents into the polymerization emulsion and sometimes include up to 0.15 part of levopimaric acid per 100 parts of polychloroprene in addition to many other unsaturated acids found in the rosins.

An especially important field of use for neoprene materials is in elastomeric articles that must withstand constant flexing in an environment that may include high temperatures and the presence of oils, grease and so on, as in automotive and industrial V-belts, conveyor belts, mounting blocks for engines and machines of various kinds, and the like. In spite of the generally good performance of the neoprenes in such uses, it has been found in practice that under severe flexural stress some neoprene products have a tendency to develop cracks that eventually lead to failure.

A solution to this problem has now been found in the incorporation in certain industrially important types of neoprenes of controlled amounts of a particular isomeric form of isoprenoid resin acid. This solution involves the method of improving the resistance of vulcanized compositions of sulfur-modified polychloroprenes to deterioration by flex cracking which consist of incorporating therein, prior vulcanization, about 0.2 to 3 parts of levopimaric acid per 100 parts of polychloroprene. It is preferred to have the levopimaric acid present during the polymerization process. Higher amounts of levopimaric acid can be used; however, the high cost of the acid makes it impractical to use larger quantities.

It is well known to compound rubber of all sorts, both natural and synthetic, with rosin acids as sources of acid reactivity, as tackifying agents, as extenders, and so on. It is also well known to use alkali or ammonia salts of various commercial rosin acid products as surface active agents in the emulsion polymerization of various monomeric compounds. Neoprenes, including the types employed in the present invention, are commonly made by emulsion polymerization using rosin soaps as emulsifying agents. It was therefore especially surprising to discover that a particular rosin acid, i.e., levopimaric acid, has such a profoundly beneficial effect on the flex cracking behavior of an equally particular class of chloroprene polymers.

The polymers of chloroprene that are improved in flex cracking resistance by incorporation of levopimaric acid are those known as sulfur-modified types. They can be made according to the procedure taught in Encyclopedia of Polymer Science and Technology, Interscience, New York, vol. 3, p. 711. They are believed to be in essence copolymers of chloroprene and a small percentage of sulfur. Minor proportions, up to about 20%, of other monomers copolymerizable with chloroprene such as 2,3-dichlorobutadiene-1,3, acrylonitrile, methacrylonitrile, styrene, acrylic acid, methacrylic acid, butadiene, isoprene, and the like may also be present in the copolymer.

The well-known mercaptan-modified polychloroprenes, another important class of neoprenes, do not show improvement in flex cracking resistance when levopimaric acid is included in vulcanized compositions made therefrom.

Levopimaric acid is a well known component of certain natural gum oleoresins and has the structure

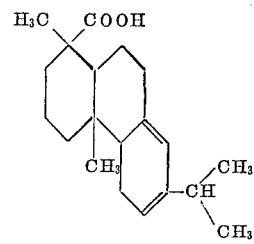

It can be employed in the method of this invention either in its pure isomeric form or as a crude product sufficiently rich in this particular isomer to provide about 0.2 to 3 parts for each 100 parts of sulfur-modified polychloroprene. It can be added to the polychloroprene at any convenient stage in the course of manufacture, say as part of the rosin soap system, or it can be blended with the dry polymer by conventional roll milling or Banbury mixing procedures during compounding of the neoprene before vulcanization. It can be used either as the free acid or as metal, e.g., alkali metal, organic amine, e.g. lower molecular weight primary and secondary amine, or ammonium salt.

The sulfur-modified neoprenes in which levopimaric acid has been incorporated are compounded and vulcanized by the usual procedures well known in the art. A thorough summary of these procedures can be found in "The Neoprenes," by R. M. Murray and D. C. Thompson, E. I. du Pont de Nemours & Co., 1963.

The practice of this invention is illustrated by the following examples, in which parts are give by weight. Standard De Mattia test specimens are molded and tested according to ASTM Method D813–59. Flex cracking resistance is determined by the number of flexes required to cause a ¼ in. crack growth in the pierced specimen. The test is run at 25° C. All tests are made with a compound consisting of the following formulation defined in parts by weight.

|  | Parts by weight |
|---|---|
| Neoprene (as specified) | 100 |
| Stearic acid | 0.5 |
| Phenyl α-naphthylamine | 2 |
| Extra light calcined magnesia | 4 |
| SRF carbon black | 29 |
| Zinc oxide | 5 |

EXAMPLE I

This example illustrates the practice of the invention by incorporating levopimaric acid during polymerization. Sulfur-modified chloroprene copolymers with 2% of 2,3- dichlorobutadiene-1,3 are made according to the procedure of Encyclopedia of Polymer Science and Technology, Interscience, New York, vol. 3, p. 711 by adding the 2,3-dichlorobutadiene-1,3 during the polymerization reaction. A control polymer is made with 4 parts per 100 parts of the above chloroprene and dichlorobutadiene of conventionally employed Nancy Wood rosin, which contains 2.1% levopimaric acid, as the emulsifying agent. Test polymers are made by substituting for part of the Nancy Wood rosin various proportions of a rosin acid containing 82% levopimaric acid, which is prepared according to the method of Loeblich, Baldwin, O'Connor and Lawrence, J. Am. Chem. Soc., 77, 6311 (1955). Flex testing of the resulting neoprenes gives the following results:

| Parts levopimaric acid per 100 parts chloroprene polymer | Cycles to ¼-in. cut growth |
|---|---|
| .084 (control) | 65,000 |
| .272 | 387,000 |
| .487 | 353,000 |
| .693 | 1,063,000 |

EXAMPLE II

This example illustrates the practice of the invention by adding levopimaric acid to a sulfur-modified chloroprene polymer after polymerization but before isolation of the product. The procedure of Example I is followed, employing 4 parts of the Nancy Wood rosin of Example I as the emulsifying agent, to make a conventional sulfur-modified chloroprene polymer. Before acidification of the latex preparatory to freeze-roll isolation of the polymer, the sodium salt of the rosin acid containing 82% levopimaric acid as in Example I is added in amounts sufficient to give polymers containing the following amounts of levopimaric acid:

| Parts levopimaric acid per 100 parts chloroprene polymer | Cycles to ¼-in. cut growth |
|---|---|
| .08 (control) | 67,500 |
| .17 | 86,500 |
| .30 | 86,500 |
| .52 | 200,000 |

EXAMPLE III

This example illustrates the practice of the invention by adding levopimaric acid to a sulfur-modified polymer in the course of compounding for vulcanization. Sufficient 70% levopimaric acid (supplied by the United States Department of Agriculture, Naval Stores Division) is included with the compounding ingredients during roll mill mixing to make the following compositions with a commercial sulfur-modified chloroprene polymer made according to the method of Encyclopedia of Polymer Science and Technology, Interscience, New York, vol. 3, p. 711.

| Parts levopimaric acid per 100 parts chloroprene polymer | Cycles to ¼-in. cut growth |
|---|---|
| .08 | 54,000 |
| .78 | 199,000 |
| 2.18 | 1,175,000 |

The embodiments of the invention in which an exclusive property or privilege is claimed are defined as follows:

1. A process for improving the flex-cracking resistance of sulfur-modified polychloroprenes which comprises incorporating in said polychloroprene, prior to vulcanization, about 0.2 to 3 parts of levopimaric acid per 100 parts of said polychloroprene.
2. A process as defined in claim 1 where said levopimaric acid is incorporated during the emulsion polymerization of said polychloroprene.
3. A process as defined in claim 1 where said levopimaric acid is incorporated during the compounding of said polychloroprene with a vulcanization agent.
4. A process as defined in claim 1 where said acid is incorporated as a metal salt, amine salt or ammonium salt.
5. A process as defined in claim 1 where said sulfur-modified polychloroprene contains up to about 20% by weight of a monomer copolymerizable with chloroprene.
6. A process as defined in claim 5 where said polychloroprene is a sulfur-modified copolymer of chloroprene and 2,3-dichlorobutadiene-1,3.
7. A vulcanizable elastomeric composition which upon vulcanization yields products having improved flex-cracking resistance, said composition comprising a non-vulcanized mixture of about 0.2 to 3 parts of levopimaric acid per 100 parts of a sulfur-modified polychloroprene.
8. A process as defined in claim 1 where said levopimaric acid is incorporated in the polychloroprene before said polychloroprene is isolated from the reaction medium.

References Cited

UNITED STATES PATENTS

| 2,608,541 | 8/1952 | Troyan | 260—27 |
| 2,505,226 | 4/1950 | Barrows | 260—27 |
| 2,648,657 | 8/1953 | Vandenberg | 260—84.1 |

OTHER REFERENCES

Azorlosa, Industrial and Eng. Chem. August 1949, pp. 1626–1629. Copy in S.L.

Whitby, Synthetic Rubber, 1954, p. 962. Copy in S.L.

MORRIS LIEBMAN, *Primary Examiner.*

S. L. FOX, *Assistant Examiner.*